June 20, 1967
O. KUTTLER
3,326,509
FASTENER FOR ROTATABLE DEVICE
Filed March 15, 1965
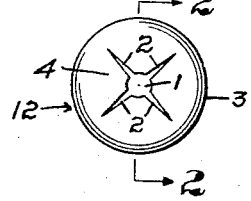
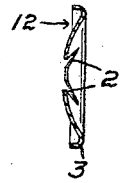
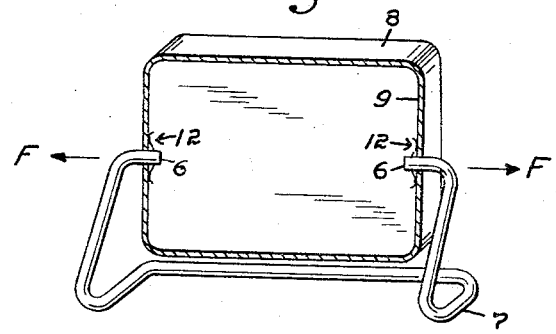
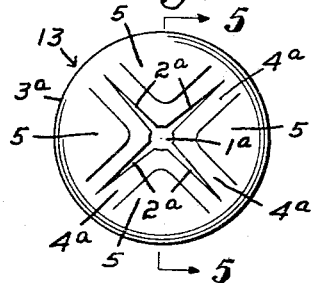
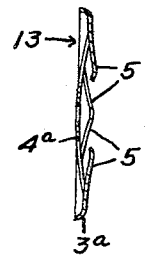
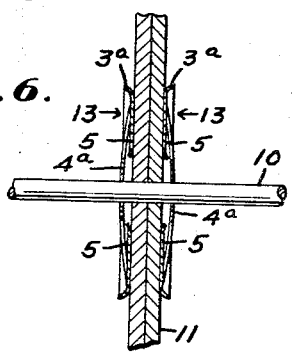
Inventor:
Otto Kuttler,
By Gordon Needleman
Atty.

United States Patent Office 3,326,509
Patented June 20, 1967

3,326,509
FASTENER FOR ROTATABLE DEVICE
Otto Kuttler, Lorrach, Baden, Germany, assignor to A. Raymond, Baden, Germany, a firm
Filed Mar. 15, 1965, Ser. No. 439,704
Claims priority, application Germany, Mar. 28, 1964, R 37,572
2 Claims. (Cl. 248—359)

This invention relates generally to fastening devices and more specifically to fastening devices for use with an article of manufacture adapted to be turned through an arc.

An object of the present invention is to provide a fastening device for holding an article of manufacture to a support wherein said support exerts a spring tension on the fastening device.

Another object of the present invention is to provide a fastening device for engagement with an article of manufacture and a support wherein the fastening device has means for exerting a spring tension against the article of manufacture.

Still another object of the present invention is to provide a fastening device for engaging an article of manufacture with a support wherein the article of manufacture may be rotated about an axis of journals of the support.

Other objects of the invention will, in part, be obvious and will, in part, appear hereinafter.

Devices, such as floor or table lamps, sun lamps, heat radiators, fans etc., should be able to be turned readily into the direction of their setting by simplifying their handling without special attendance. Likewise it is of advantage to be able to effect a change of the setting without cumbersome loosening and retightening of screws. The present invention permits the desired rapid shifting in a simple manner and improves the handling and attendance of these devices. At the same time the invention concerns the fastening of the device on its support, which can be of any design.

The invention consists of a friction-increasing clamping plate, which is designed similar to a spring nut and which takes over its function simultaneously on engagement. Its application requires that a spring tension act on the clamping plate by which the friction between the device and the support is correspondingly increased, so that any accidental change of position is prevented after the device has been set. On the other hand, it should require relatively little outside force to effect any desired turning of the device in the sense of its inclination or raising with regard to the support.

For the realization of the subject of the invention there are provided clamping plates which have in their center a hole for the introduction of the journal of the support, this journal forming the axis of rotation. This hole has a somewhat smaller diameter than the journal. From the center of the clamping plate radiate cutouts which terminate ahead of the bent-over edge of the clamping plate, thus forming tongue-shaped sections. In order to achieve a better spring nut effect, it is necessary to bend the clamping plate in the manner of a dish.

The application of the clamping plate according to the invention requires an initial stress to increase the friction by pressing the clamping plate on the wall of the device.

This can be achieved, for example, by arranging the device between the arms of its support with the two journals protruding into the latter, the journals having an outwardly directed spring tension. In this case the clamping plates area arranged inside the wall of the device on the two journals. But, if necessary, an inwardly acting spring tension can also be exerted on the journals. The clamping plates would, therefore, have to be applied in the latter case on the outer wall of the device on the journals.

In a further development of the invention, a clamping plate may be provided to produce the spring tension necessary to increase the friction between the device and the clamping plate by means of the plate itself. To this end, the clamping plate is provided with resilient supporting tongues which protrude from the interior of the disk. In the assembled state, these tongues bear resiliently on the wall of the device and secure thus the spring tension required to increase the friction. The design of these supporting tongues can vary according to the requirements. Preferably the supporting tongues are arranged inside the resilient tongue sections and are therefore smaller than the latter. The roots of these supporting tongues are arranged, just like the resilient tongue sections, on the edge of the clamping plate, and they point with their tongue end to the center of the clamping plate; but the supporting tongues are bent against the shell curvaure beyond the edge.

FIG. 1 shows a clamping plate according to the invention in a plan view;

FIG. 2 is a cross section taken on line 2—2 of FIG. 1;

FIG. 3 is a perspective view, partly in section, of the clamping plate engaged with a support and an article of manufacture;

FIG. 4 is a top plan view of a variation of the clamping plate shown in FIG. 1;

FIG. 5 is a section taken on line 5—5 of FIG. 4; and

FIG. 6 is a side elevation partly in section of the clamping plate shown in FIG. 4 engaged with a support and an article of manufacture.

The round clamping plate or ratchet plate 12 shown in FIGS. 1 through 3 contains in its center a hole 1 for receiving a circular journal 6 of the support 7 of a device 8. The diameter of this hole 1 is somewhat greater than that of the journal 6 to be passed through. From the center of the clamping plate 12 radiate four narrow cutouts 2 which extend to the edge 3, thereby forming four tongue-shaped sections 4. The uncut edge 3 is bent over so that only one arced surface can come in contact with the device wall 9. The clamping plate 12 itself is slightly dish-shaped in the same direction as the bent over flange of the clamping plate edge 3.

If these clamping plates 12 are attached, for example, on the inside of a device wall 9 on the two journals 6 of the respective fork-shaped support 7, as shown in FIG. 3, the two clamping plates 12 are pressed by the outwardly acting spring force F of the two journals on the device wall 9, so that the device is not only firmly secured on its support, but also prevented sufficiently from turning accidentally with regard to the support. On the other hand, the clamping force and the increased friction respectively are only so high that it is possible at any time to incline or raise the device with relatively little effort with regard to the support 7, depending on the provided setting.

FIGS. 4 through 6 show another clamping plate 13, in a further development of the invention, which is provided with resilient supporting tongues 5. Otherwise the clamping plate 13 is similar to that shown in FIGS. 1 and 2 and similar numbers with the subscript $a$ are used to designate like parts. These resilient supporting tongues 5 have the effect that a special initial stress between the support and the device is not necessary. If a pair of these clamping plates 13 is attached on the journal ends 10 of a swivel joint 11, for example, in a lamp etc., as shown in FIG. 6, they will act not only as such, but also as spring nuts. The clamping and the desired increased friction respectively are produced in the clamping plate 13 itself, namely by the resilient tongues 5 which bear on the wall of the device.

Naturally it is also possible within the framework of the present invention to impart to the clamping plates any form that seems necessary and indicated for the respective case. This includes particularly the design and dimensioning of the resilient tongues, which is not limited to that of the embodiment shown in FIGS. 4 through 6.

The present invention makes additional measures for clamping devices in their respective setting unnecessary, and it permits at any time to change the setting. The operation of the device is thus simplified.

Since certain other obvious modifications may be made in this device without departing from the scope of the invention, it is intended that all matters contained herein be interpreted in an illustrative and not in a limiting sense.

I claim:

1. The combination of a device having a pair of spaced apertured side walls each of said side walls having an external surface, a support member including a pair of flexible legs, said legs being in parallel relationship to each other and each of said legs having an engagement portion extending therefrom, said engagement portions being spaced from each other a distance greater than the distance between said walls and being directed toward each other and being subject to an outwardly directed force away from each other and one of said engagement portions passed through one of said apertures in said wall and the other of said engagement portions passed through the other of said apertures formed in said walls, the major portion of said legs lying outside said device in spaced relation thereto and a pair of ratchet plate members, a single ratchet plate member engaged with each of said engagement portions whereby said engagement portions are held in connection with said device and said device is rotatable through an arc about said engagement portions.

2. The combination as set forth in claim 1 wherein each of said ratchet members includes a dished base portion, an aperture formed through said base portion and a series of slots extending radially from said aperture toward the periphery of said base portion, each of said tongues having a free terminal edge and said free terminal edges engaging about said engagement portion and said base portion engaging against the inner surface of each of said walls.

References Cited

UNITED STATES PATENTS

| | | | |
|---|---|---|---|
| 606,024 | 6/1898 | Peraglie et al. | 248—359 |
| 617,259 | 1/1899 | Roenius | 248—359 |
| 1,042,159 | 10/1912 | Simmons | 248—359 |
| 2,321,158 | 6/1943 | Rees | 85—36 |
| 2,724,571 | 11/1955 | Friedman et al. | 248—151 |
| 2,754,717 | 7/1956 | Becker | 85—36 |

CLAUDE A. LE ROY, *Primary Examiner.*

R. P. SEITTER, *Assistant Examiner.*